United States Patent Office 3,140,309
Patented July 7, 1964

3,140,309
PREPARATION OF ISOPHTHALIC ACID MONOESTER
Alan E. Ardis, Hamden, and Alexander A. Vaitekunas, New Haven, Conn., assignors, by mesne assignments, to Socony Mobil Oil Company, Inc., a corporation of New York
No Drawing. Filed Nov. 3, 1958, Ser. No. 771,227
3 Claims. (Cl. 260—475)

This invention relates to novel monoester of isophthalic acid and process of preparing the same.

It has been customary in the past to prepare the polymeric isophthalate of ethylene glycol by procedures involving first the production of highly purified dimethyl or other dialkyl isophthalate and then conversion by ester interchange to the glycol ester. The subsequent preparation of the desired polymeric ester was then accomplished with the removal by vaporization of the methyl alcohol and substantially half of the ethylene glycol present in the intermediate diester which is split out during the condensation reaction resulting in the desired polymer.

The above complex procedure has been considered essential heretofore for the elimination of traces of monobasic acids, such as benzoic or toluic acids, generally present in commercially produced isophthalic acid as they tend to terminate the desired polymerization reaction prematurely.

Attempts to prepare a glycol ester of isophthalic acid directly for subsequent polymerization have not been commercially successful in the past mainly because of the difficulties involved in purifying the resulting di-(beta-hydroxyethyl)-isophthalate.

The objects of this invention include the provision of a novel monoester of isophthalic acid, which can readily be purified to polymerization grade, and of a process readily adapted for the efficient preparation of such ester.

It has now been found in accordance with this invention and in fulfillment of the above and other objects, that mono-(beta-hydroxyethyl)-isophthalate can be prepared readily and that this novel compound has such a unique combination of properties as to facilitate purification by crystallization to a product of high quality, substantially free of monobasic acid and well adapted for polymerization. Furthermore, this monoester may be converted to the desired polyester without the formation of ethylene glycol which must be recovered.

It has been found that mono-(beta-hydroxyethyl)-isophthalate is formed in excellent yield by the reaction of mono-sodium or other alkali metal isophthalate in aqueous medium with substantially an equi molar amount of ethylene oxide. The reaction with ethylene oxide is best carried out at a temperature above about 50° C., preferably at about 80° to 100° C. Somewhat higher temperatures up to about 130° C. may be used, with the application of super-atmospheric pressures to prevent boiling of the aqueous medium. The proportion of alkali metal ion present is preferably substantially equi molar with the isophthalic acid, although an excess or deficiency of up to about 10 to 20% is effective.

The addition of the desired amount of ethylene oxide, substantially equi molar with the isophthalic acid content of the reaction mixture may be controlled by observing the increase in weight.

However, it is generally preferable to add and react ethylene oxide until the originally acid reaction mixture just becomes slightly alkaline, as indicated for example by the change of phenolphthalein indicator from colorless to a faint pink.

The proportion of water in the reaction mixture should be at least sufficient to dissolve the resulting monoester at the reaction temperature, and may advantageously amount to 30 to 60 times the weight of the isophthalic acid present.

Carried out in this way, the main reaction which occurs is as represented by the following equation:

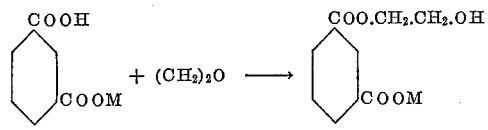

where M represents an alkali metal, for example sodium, potassium or lithium.

The following examples are illustrative embodiments of the process of this invention.

EXAMPLE 1

One hundred parts by weight of isophthalic acid (commercial grade, 98% isophthalic acid), 24.0 parts by weight of sodium hydroxide and 4500 parts by weight of water were placed in a 5 liter three-necked flask, equipped with a reflux condenser, stirrer and gas inlet tube. This reaction mixture was heated to 95° C. and ethylene oxide was bubbled through (approximately 3–4 bubbles/sec.) until the mixture became neutral to phenolphthalein indicator. The hot solution was filtered to remove insoluble impurities, usually present in commercial grades of isophthalic acid.

The filtrate was concentrated by evaporation to approximately 500 ml., cooled to 40°–50° C. and acidified with 30.4 parts of concentrated sulfuric acid (spec. gr. 1.84), which had just been mixed with 100 parts of ice.

A thick paste was obtained which was filtered. This filter cake was boiled with 250 parts of water and filtered again. The filter cake consisted essentially of recovered isophthalic acid.

The filtrates werec ooled to approximately 5° C. in ice-water. Heavy cheese-like precipitates of impure mono-(beta-hydroxyethyl)-isophthalate were obtained. These were filtered, combined and dried at 60° C. and 300 mm. Hg pressure to constant weight. Thus, 85.0 parts of the monoester were obtained which had a melting range from 110° to 140° C.

Further extraction of the recovered isophthalic acid cake with 200 parts of boiling water and concentration of this filtrate as well as of the filtrates from the first monoester crop further yielded 8 parts of crude product, which had a melting range from 145–165° C. The last filtrate was extracted with two 150 ml. portions of methyl-isobutylketone and yielded 14.0 parts of a mixture of bis- and mono-(beta-hydroxyethyl)-isophthalates melting at 100–132° C.

Fifteen parts of isophthalic acid were recovered.

Thus, the total amount of crude mono-isophthalate obtained was 93.0 parts or the yield per pass was 73% of theoretical and the yield based on the isophthalic acid consumed was 90%.

Seventy-nine parts of crude mono-(beta-hydroxyethyl)-isophthalate was dissolved in 250 parts of boiling water and filtered. The filtrate on cooling to approximately 5° C. gave 45.0 parts of purified mono-(beta-hydroxyethyl)-isophthalate melting at 131–132° C.

Further recrystallization from water or from dioxane-benzene solution did not raise the melting point.

Analyses of the crystallized mono-isophthalate ester for carbon and hydrogen content and for neutral equivalent were very close to the theoretical 57.1% carbon, 4.76% hydrogen and neutral equivalent of 210.

EXAMPLE 2

A solution of 800 ml. of water containing 20.8 grams of isophthalic acid and 6.1 grams of sodium hydroxide was heated to 95° C. Ethylene oxide was bubbled into this hot solution over a period of 100 minutes at which time the solution became neutral to phenolphthalein indicator and a weighing of the flask contents showed an absorption of 5.5 grams of ethylene oxide. After evaporating most of the water at 30 mm. on a hot water bath the residue was treated gradually with a solution of 7.5 grams of sulfuric acid in 100 ml. of ice water and then filtered. The filter cake was leached with two portions (100 ml. and 75 ml.) of water at 60–70° C. for thirty minutes each. The above filtrate and these two leachings were combined and concentrated to approximately half their volume by distillation at 30 mm. The precipitate which formed on cooling the residue was filtered and dried in a vacuum oven at 30 mm. and 90° C. The dried product weighed 19.8 grams and melted at 124–125° C.

The residue from the hot leachings, unreacted isophthalic acid, was dried and weighed 3.2 grams. The yield of monoester based upon reacted isophthalic acid was 89%.

A sample of the product was recrystallized from hot water and dried for analysis. Its neutral equivalent was 209 (the theoretical neutral equivalent for mono-(beta-hydroxyethyl)-isophthalate is 210. The melting point was 131–132° C.

The melting point of the above novel mono-isophthalate, 131–132° C., is sufficiently high to facilitate purification by crystallization processes and furthermore, the solubility in water and certain common organic solvents is favorable for such purification. In contrast, bis-(beta-hydroxyethyl)-isophthalate has a melting point of 74°–75° C. when pure, and usually 35°–40° C. with a small impurity content, tending to supercool and being difficult to purify by simple crystallization procedures.

It will be apparent from the following solubility table that the novel mono-isophthalate can readily be purified by recrystallization from any of the listed solvents.

*Solubility of Mono-(Beta-Hydroxyethyl)-Isophthalate*

| Solvent: | Solubility, by weight |
|---|---|
| Water (20° C.) | 5–10% |
| Water (100° C.) | 40–60% |
| Acetone (20° C.) | Insoluble |
| Acetone (56° C.) | 1–5% |
| Dioxane (20° C.) | 5–10% |
| Dioxane (101° C.) | 40–60% |
| Methylene chloride (20° C.) | 1–5% |
| Methylene chloride (40° C.) | 5–10% |

However, the bis-(beta-hydroxyethyl)-isophthalate is very soluble (40 to 60% by weight) in the above solvents, both at the high and low temperatures, thus providing an unfavorable situation for purification by simple crystallization procedures.

The advantageous solubility characteristics of the novel mono-isophthalate are particularly surprising as the mono-(beta-hydroxyethyl)-terephthalate displays substantially lower solubilities. For example, it is insoluble in acetone at 56° C., is soluble to an extent of less than 5% by weight in dioxane at 101° C. and in methylene chloride at 40° C., while water at 100° C. dissolves only 5 to 10% by weight.

The following examples are illustrative of the ready polymerizability of the mono-ester to useful film- and fiber-forming polymers, without the splitting out of substantially half of the glycol as required in conventional processes using the monomeric bis-isophthalate.

EXAMPLE 3

16.0 parts by weight of purified mono-(beta-hydroxyethyl)-isophthalate and 0.006 part of zinc acetate dihydrate were placed into a glass polymerization vessel blanketed with nitrogen gas and rapidly heated to 235° C. by means of a vapor bath containing refluxing 1,3,5-triisopropyl benzene. The pressure was slowly (over a period of 30 minutes) reduced to 0.4 mm. Hg.

The polymerization was continued for an additional 6½ hours at 235° C. and at approximately 0.4–0.6 mm. Hg pressure.

The resulting polymer was light colored. It became increasingly soft from approximately 100° C. upward and gave a clear melt at 235° C. It could be drawn to fibers which were flexible.

EXAMPLE 4

10.0 parts by weight of purified mono-(beta-hydroxyethyl)-isophthalate, 0.006 part of zinc acetate dihydrate and 3 parts of ethylene glycol were placed into a glass polymerization vessel blanketed with nitrogen gas and heated by means of vapor of refluxing propylene glycol (189° C.) for 2 hours. Then this vapor bath was replaced by a 1,3,5-triisopropyl benzene vapor bath (235° C.) and the pressure was slowly reduced to 0.4 mm. Hg over a period of approximately one hour. The polymerization was continued for 3 additional hours at 235° C. and 0.4 mm. Hg pressure. Finally, the temperature was raised to 281° C. by means of vapor of refluxing dimethyl phthalate and the polymerization was continued for 5 additional hours while maintaining the Hg pressure of 0.4–0.6 mm.

The polymer was slightly colored (yellow tint) and softened gradually from approximately 105° C. upward and gave a clear melt at 235° C. It could be easily drawn to fibers which were flexible and strong. They could be drawn to approximately 400–500% under water at 75° C. The intrinsic viscosity of this polymer was found to be 0.48.

EXAMPLE 5

10.0 parts of purified mono-(beta-hydroxyethyl)-isophthalate (neutral equivalent 209.0), 0.006 part of zinc acetate dihydrate and one part of ethylene glycol were polymerized under analogous conditions to those described in Example 4. The polymer properties were very similar to that described above and it had an intrinsic viscosity of 0.44.

Useful copolymers may likewise be prepared by subjecting mixtures of the mono-isophthalate of this invention with glycol terephthalate, for example bis-beta-hydroxyethyl)-terephthalate, to polymerization conditions similar to those in the above examples. Such copolymers may advantageously contain 10% to 90% by weight of isophthalate units and may include one or more added chain units by the addition of one or more suitable diester, diamine, or aminoacid monomers to the polymerization mixture.

The novel mono-isophthalate of this invention is also a source of isophthalic acid of exceedingly high purity. For such purpose, the recrystallized mono-isophthalate is subjected to conventional hydrolysis treatment with strong hydrochloric, sulfuric or phosphoric acid or may be saponified by treatment with strong caustic solution, followed by neutralization with acid and filtration, washing and drying of the precipitated pure isophthalic acid.

We claim:
1. In the preparation of purified isophthalic acid monoesters, the process comprising dispersing isophthalic acid containing monobasic acid impurities in an aqueous medium containing a substantially equi-molar amount of an alkali metal ion and 30 to 60 parts by weight of water per part by weight of isophthalic acid, reacting a substantially equi-molar amount of ethylene oxide therewith at a temperature of about 50° C. to 130° C., acidifying the solution and precipitating isophthalic acid, separating the solution from the precipitated acid, and recovering mono-(beta-hydroxyethyl)-isophthalate from the said solution.

2. The process of claim 1, wherein the aqueous medium is maintained at a temperature of 80° to 100° C.

3. The process of claim 1, wherein the alkali metal is sodium.

References Cited in the file of this patent

UNITED STATES PATENTS

| | | |
|---|---|---|
| 1,883,182 | Webel | Oct. 18, 1932 |
| 1,946,202 | Gabriel | Feb. 6, 1934 |
| 2,742,494 | Mraz | Apr. 17, 1956 |
| 2,862,957 | Siggel et al. | Dec. 2, 1958 |
| 2,867,650 | Van Lohuizen et al. | Jan. 6, 1959 |
| 2,901,505 | Kolb | Aug. 25, 1959 |

FOREIGN PATENTS

| | | |
|---|---|---|
| 623,669 | Great Britain | May 20, 1949 |